3,483,291
PREPARATIONS HAVING PROTRACTED ACTH-EFFECT AND METHOD FOR PRODUCING THEM
Gerhard Vogel, Hofheim, Taunus and Rolf Geiger and Karl Sturm, Frankfurt am Main, Germany, assignors to Farbwerke Hoechst Aktiengesellschaft vormals Meister Lucius and Bruning, Frankfurt am Main, Germany, a corporation of Germany
No Drawing. Filed Dec. 6, 1965, Ser. No. 512,000
Claims priority, application Germany, Dec. 12, 1964, F 44,686; May 5, 1965, F 45,963; Sept. 4, 1965, F 47,093
Int. Cl. A61k 17/16
U.S. Cl. 424—179          2 Claims

ABSTRACT OF THE DISCLOSURE

A product having a prolonged ACTH-effect and method for preparing it by combining (a) an aqueous solution of ACTH or of $\beta^{1-23}$-corticotropin-23-amide with (b) an aqueous solution of polyphloretin phosphate and (c) a solution of natural gelatin or of partially degraded gelatin, which gelatins are de-aminated or have amino groups which are at least partially acylated.

---

The present invention relates to preparations having protracted ACTH-effect and to a process for producing them.

We have found that ACTH-preparations having a protracted ACTH-effect can be prepared by combining
(a) Aqueous solutions of ACTH or of synthetically prepared peptides having ACTH-effect,
(b) Solutions of natural or partially degraded gelatin the amino groups of which are fully or partially substituted by acylation or carboxy-alkylation, or natural or partially degraded gelatin which has been treated with nitrous acid, and
(c) Aqueous solutions of higher molecular weight polymer, containing a phosphorus bridge, said polymer being a condensation product of phosphoric acid or thio-phosphoric acid and an aromatic or aromatic-aliphatic compound which contains three or more OH—, SH— or NH— groups linked to the nucleus or only two such groups which are linked either to different nuclei or linked in meta- or para-position to the same nucleus, and which may also contain groups derived from sulfuric acid, phosphoric acid or thiophosphoric acid. If desired or required, the aqueous solutions so obtained may be freeze-dried.

As peptides having ACTH-effect, there are suitable, in addition to the natural corticotropins having a chain length of 39 amino-acids, also synthetic peptides having a chain length of at least 20 amino-acids, counted from the terminal amino group, or those having a chain length of at least 18 amino-acids, if the terminal carboxyl group is present in the form of an amide. In particular, there are used peptides having a chain length of 23–24 amino-acids, preferably as ω-amides, for example, $\beta^{1-23}$-corticotropin-23-amide or $\beta^{1-24}$-corticotropin-24-amide.

The gelatin used according to the invention may be a natural or a partially degraded gelatin. Degradation of the gelatin may be effected, for example, by mild hydrolysis. The free amino groups of this protein may be substituted completely or partially, for example, by acetyl, propionyl or acyl groups derived from higher aliphatic carboxylic acids. The acyl groups may themselves carry hydroxyl or alkoxy groups. Acylation may be effected also with dicarboxylic acids, for example, with succinic acid, glutaric acid or adipic acid, the second carboxyl group being an additional substituent or being bound to another amino group of the protein by cross-linking.

As acyl groups, there enter also into consideration carbamoyl or carbalkoxy groups. These carbamoyl or carbalkoxy groups may be derived from aliphatic amines or diamines or from aliphatic alcohols or diols. Under aliphatic amines, there are to be understood preferably those containing 1 to 4 carbon atoms, and under aliphatic diamines preferably those containing 2 to 6 carbon atoms. The same is true of the aliphatic alcohols or diols. Furthermore, the amino groups may be substituted by carboxyalkyl groups, for example, carboxymethyl or carboxyethyl groups.

If groups derived from aliphatic carboxylic acids are present, the acylation of the free amino groups of gelatin is carried out in the usual manner, for example, by reaction with carboxylic acid chlorides, thus analogously to the benzoylation of proteins described for example, in J. Biol. Chem. 146 (1942), page 331. Furthermore, acylation may be carried out with acid anhydrides by the method described in Adv. Prot. Chemistry 3 (1947), page 192. The carbalkoxy derivatives can be prepared in a manner anlogous to the carbobenzoxylation described in Nature 136, (1935), page 348, and Biochem. Journ. 33 (1939), page 908, by reaction with chlorocarbonic acid alkyl esters. The easiest way to prepare the carbamoyl compounds is that using isocyanates or di-isocyanates. As such, there enter into consideration: dimethylene-di-isocyanate, trimethylene-di-isocyanate, tetramethylene-di-isocyanate, pentamethylene-di-isocyanate or hexamethylene-di-isocyanate. The reaction of gelatin (natural or partially degraded) with di-isocyanates is described, for example, in German Patents 1,118,792 and 1,155,134. For carboxyalkylation, the amino groups are reacted in a manner analogous to the preparation of carboxy-methyl-collagen described in Chem. Abstr. 47 (1953), 901e, with halogenocarboxylic acids or by fixing unsaturated carboxylic acids such, for example, as acrylic acid, to the amino groups.

When the reaction is complete, the aqueous solutions of these compounds are dialyzed against distilled water and freeze-dried.

The preparation of deaminated gelatin (natural or partially degraded) by reaction with nitrous acid, which is set free from mineral or organic nitrite in an acid solution, is as such known. Thus, for example, it is possible to allow $NaNO_2$ to act on gelatin at room temperature, in an acid aqueous solution and at a pH in the range of 1.5 to 3.5. For acidification sulfuric acid is preferably used. Hydrochloric acid is less recommended, because if it is used the deaminated gelatin may contain a small amount of chlorine. After the reaction, the gelatin is dialyzed against distilled water in order to remove any salts. The deaminated gelatin is then recovered by freeze-drying or by precipitation with a suitable solvent such as alcohol or acetone. If degraded gelatin is deaminated, cautious degradation is carried out according to the method described in German Patent 1,118,792, by heating it for some hours in an autoclave to 120° C. at a pH ranging from 6.9 to 7.9. After acidification with sulfuric acid of the solution obtained, deamination is then effected advantageously by adding $NaNO_2$. A similar method is described, for example, in German Patent 1,179,944.

If it is desired to carry out the deamination without salt, a solution of the gelatin in aqueous acetic acid may be combined with a nitrous acid alkyl ester such as ethyl nitrite, butyl nitrite or amyl nitrite. The nitrous acid set free in an acid medium from the ester then causes deamination. When the reaction is complete, the gelatin is precipitated by means of alcohol or acetone; the precipitate is thoroughly digested with the same solvent, filtered off and dried under reduced pressure.

As higher molecular weight phosphoric acid esters, there may be used, for example, those described in German Patent 929,664, i.e. the phosphoric acid esters of chalcone- or dihydrochalcone derivatives containing hydroxy groups, preferably polyphloretin phosphate. But other higher molecular weight condensation products which contain phosphorus bridges, for example, the compounds described in German Patent 1,024,677, may also be used.

For preparing the new depot preparations, the individual components, for example, an ACTH-peptide, polyphloretin phosphate and one of the above-mentioned gelatin derivatives are separately dissolved in water; the acid solution of the higher molecular weight phosphoric acid condensation product and, if this is the case, the acid solution of the gelatin derivatives are neutralized with a mineral base such as KOH, NaOH or $NH_3$, or with an organic base, for example, a tertiary amine such as triethylamine or N-ethylpiperidine.

The filtered solutions of the components are then combined in any sequence with the ACTH-peptide solution. The whole is then adjusted to isotonicity by means of NaCl or a suitable physiologically tolerated organic compuond, for example, an amino-acid, and the pH of the solution is adjusted to a value in the range of from 5.5 to 7.5, preferably 6.5 to 7.2. The solution is then preferably 6.5 to 7.2. The solution is then filtered under sterile conditions, if required or desired after addition of bactericidal agents such as phenol, thymol, and the like, and filled into containers under sterile conditions, and, if desired or required, freeze-dried. If freeze-drying is intended, it is of advantage to use sodium glutamate for making the solution isotonic.

The proportion of the individual components may vary within certain limits. In general, the phosphoric acid condensation products and the gelatin derivative are used in excess. Preferably, at least 50 times the quantity by weight, referred to ACTH-peptides, is used, the upper limit being at 250–300 times that quantity by weight.

The protracted effect of natural ACTH caused by the addition of, for example, polyphloretin phosphate is described in German Patent 1,024,677. This protracted effect is distinctly increased by the addition of the gelatin derivatives according to the present invention. In addition thereto, the special advantage of the process of the invention is that not only natural ACTH, but also synthetic ACTH-peptides having shorter chains, can be converted into depot preparations. It was hitherto not possible to convert synthetic ACTH-peptides in the manner known for natural ACTH into depot preparations having a sufficiently protracted effect.

In addition to the increase in the protraction of the ACTH-effect, the process of the present invention has the advantage over the process describde in German Patent 1,024,677 that, in contradistinction to the combined products described in the said German patent, the products of the present invention are in all cases easily soluble even at neutral pH so that the injectability of the products is in no way limited.

In column 2, lines 46 to 50, of the said German patent is stated that in certain cases, in particular when low molecular weight ACTH-peptides are used, the coupling product may be difficultly soluble at pH-values around the neutral point. These statements, however, can only refer to ACTH-peptides containing at least 39 amino-acids, because synthetic ACTH-peptides having a shorter sequence of chains were not yet known to the date when the German Patent 1,024,677 was filed. Application of the known process to synthetic ACTH-peptides (having about 18 to 24 amino-acids, thus a considerably smaller molecular weight), yields combined products which are still more difficulty soluble, as was also to be expceted by reason of the statements in the said patent 1,024,677.

Thus, it was very surprising that always easily soluble combined products are obtained with synthetic as well as with natural ACTH-peptides by the process of the present invention. This is a considerable advance in the art.

The ACTH-preparations with protracted effect are prepared in a particularly advantageous manner according to the following method: the ACTH-peptide solution is first combined with the solution of the gelatin derivative and to the resulting solution is added the aqueous solution of high molecular weight polymer containing a phosphorus bridge, said polymer being a condensation product of phosphoric acid or thiophosphoric acid and an aromatic or aromatic-aliphatic compound which contains three or more OH—, SH— or NH— groups linked to the nucleus or only two of such groups linked either to different nuclei or linked in meta- or para-position to the same nucleus, and which may also contain acid groups derived from sulfuric acid, phosphoric acid or thiophosphoric acid.

This sequence of combining the solutions avoids any occurrence of precipitations, which can be removed by prolonged stirring only, because the gelatin derivative is always present in such an excess that the easily soluble combined product forms directly from the three components.

The improved protracted effect of the new ACTH-combined products containing the gelatin derivatives according to the present invention, compared with that of the known ACTH-polyphloretin phosphate combined products and other preparations formerly recommended as depot-ACTH, for example combined products of ACTH with gelatin or zinc complexes, is shown in the following table. In this table is indicated in $\gamma$/ml. the corticosterone blood level in the peripheral blood of rats treated with dexamethasone, within 1–6 hours after administration of the various depot preparations. In this table, "Gelatin derivative I" means partially degraded gelatin which is cross-linked with hexamethylene di-isocyanate and which is prepared according to the method described in Example 1 of German Patent 1,118,792. "Gelatin derivative II" means a deaminated Gelatin derivative prepared according to Example 3a given hereinafter.

TABLE

| Depot preparation | Corticosterone blood level (in y/100 ml.) after— | | | |
|---|---|---|---|---|
| | 1 hr. | 2 hrs. | 4 hrs. | 6 hrs. |
| $\beta^{1-23}$-Corticotropin-amide plus Polyphloretin phosphate | 45 | 37 | 14 | 6 |
| $\beta^{1-23}$-Corticotropin-amide plus Gelatin derivative I | 27 | 4 | 6 | 4 |
| $\beta^{1-23}$-Corticotropin-amide plus Gelatin derivative II | 30 | 5 | 5 | 3 |
| Natural ACTH plus Polyphloretin phosphate | 48 | 47 | 35 | 10 |
| Natural ACTH plus Gelatin | 33 | 16 | | |
| $\beta^{1-23}$-Corticotropin-amide plus Gelatin | 42 | 18 | | |
| $\beta^{1-23}$-Corticotropin-amide plus Zn++-human-globin | 38 | 15 | 6 | 6 |
| $\beta^{1-23}$-Corticotropin-amide plus Gelatin derivative I plus Polyphloretin phosphate | 49 | 46 | 41 | 21 |
| $\beta^{1-23}$-Corticotropin-amide plus Gelatin derivative II plus Polyphloretin phosphate | 55 | 51 | 43 | 23 |
| Natural ACTH plus Gelatin derivative I plus Polyphloretin phosphate | 51 | 47 | 42 | 25 |

The products of the present invention are valuable medicaments which may be used, for example, as therapeutic agents for the treatment of disorders of the pituitary gland, general allergic reactions or affections of the hematopoetic system.

The following example illustrate the invention, but they are not intended to limit it thereto:

EXAMPLE 1

8.0 g. of polyphloretin phosphate were dissolved in 50 cc. of water. The solution was neutralized with 30 cc. of 1 N NaOH and filtered. At the same time, 10 g. of gelatin derivative I (prepared according to German Patent 1,118,792, Example 1, and then freeze-dried) were dissolved in 90 cc. of water; furthermore, 40 mg. of $\beta^{1-23}$-corticotropin-23-amide having 100 I.U./mg. and 400 mg. of NaCl were dissolved in 20 cc. of water. The solutions were combined. After the pH was adjusted to 6.8, the solution was made up with water to a volume of 200.0 cc., and after sterile filtration it was filled under sterile conditions into vials having a capacity of 1 cc. each and freeze-dried; the vials were then sealed.

EXAMPLE 2

8.0 g. of polyphloretin phosphate were dissolved in 50 cc. of water. The solution was neutralized with 30 cc. of 1 N NaOH and filtered. At the same time, 10 g. of gelatin derivative I (prepared as described in Example 1) and 1.0 g. of phenol were dissolved in 90 cc. of water and the resulting solution was neutralized with 2 N NaOH. Furthermore, 40 mg. of $\beta^{1-23}$-corticotropin-23-amide were dissolved in 20 cc. of water. The solutions were combined and after the pH was adjusted to 7.0, the whole was made up with water to a volume of 200.0 cc. and filtered under sterile conditions. The solution was then filled into vials having a capacity of 1 cc. each which were then sealed.

EXAMPLE 3

(a) Preparation of partially degraded deaminated gelatin ("Gelatin derivative II").—100 g. of bone gelatin were dissolved in 1 liter of water. The pH of the solution was adjusted to 7 and the solution was heated in an autoclave for 5 hours to 120° C. After the solution was cooled to room temperature (about 20° C.), the pH was adjusted to 2.5 by means of sulfuric acid. An aqueous solution of $NaNO_2$ was then added at about 20° C. until a potassium iodide starch paper indicated the presence of free nitrous acid. After 1 hour, the reaction mixture was cooled to 0° C. and dialyzed for 12 hours at this temperature against distilled water. By freeze-drying or by pouring the aqueous solution into alcohol or acetone, the deaminated gelatin was obtained in the form of a loose powder.

(b) 8.0 g. of polyphloretin phosphate were dissolved in 50 cc. of water. The resulting solution was neutralized with 30 cc. of 1 N NaOH and filtered. At the same time, 10 g. of gelatin derivative II (prepared as described under (a)) were dissolved in 90 cc. of water; furthermore, 40 g. of $\beta^{1-23}$-corticotropin-23-amide and 400 mg. of NaCl were dissolved in 20 cc. of water. The solutions were combined. After the pH was adjusted to 6.8, the whole was made up with water to a volume of 200.0 cc. and, after sterile filtration, it was filled under sterile conditions into vials each having a capacity of 1 cc. and freeze-dried; the vials were then sealed.

EXAMPLE 4

8.0 g. of polyphloretin phosphate were dissolved in 50 cc. of water. The resulting solution was neutralized with 30 cc. of 1 N NaOH and filtered. At the same time, 10 g. of gelatin derivative II (prepared according to Example 3(a)) and 1.0 g. of phenol were dissolved in 90 cc. of water, and the solution was neutralized with 2 N NaOH. Furthermore, 40 mg. of $\beta^{1-23}$-corticotropin-23-amide were dissolved in 20 cc. of water. The solutions were combined. After the pH was adjusted to 7.0, the whole was made up with water to a volume of 200.0 cc. and filtered under sterile conditions. The solution was then filled under sterile conditions into vials each having a capacity of 1 cc. and the vials were sealed.

EXAMPLE 5

8.5 g. of polyphloretin phosphate were dissolved in 50 cc. of water. The resulting solution was neutralized with 30 cc. of 1 N NaOH and filtered. At the same time, 10 g. of gelatin derivative I (prepared as described in Example 1), 40 mg. of $\beta^{-23}$-corticotropin-23-amide having 100 I.U./mg., and 400 mg. of Nacl were dissolved in 100 cc. of water. The polyphloretin phosphate solution was then allowed to run slowly into this solution while stirring. A clear to slightly opalescent solution was obtained. After the pH was adjusted to 6.5–7.0, the whole was made up with water to a volume of 200.0 cc. and after sterile filtration it was filled under sterile conditions into vitals each having a capacity of 1–2 cc., and freeze-dried; the vials were then sealed.

EXAMPLE 6

8.0 g. of polyphloretin phosphate were dissolved in 50 cc. of water. The resulting solution was neutralized with 30 cc. of 1 N NaOH and filtered. At the same time, 10 g. of gelatin derivative I (prepared as described in Example 1), 40 mg. of $\beta^{1-23}$-corticotropin-23-amide having 100 I.U./mg. and 400 mg. of Nacl were dissolved in 100 cc. of water. The polyphloretin phosphate solution was then allowed to run slowly into this solution while stirring. A clear to slightly opalescent solution was obtained. After the pH was adjusted to 6.5–7.0, the whole was made up with water to a volume of 200.0 cc. and filtered under sterile conditions. The solution was then filled under sterile conditions into vials each having a capacity of 1–2 cc. and the vials were sealed.

EXAMPLE 7

The process was carried out as described in Example 5, but using 10 g. of carboxymethyl gelatin prepared according to the method indicated in Chem. Abstr. 47, (1953), page 901e, instead of the gelatin derivative described in Example 5.

EXAMPLE 8

The process was carried out as described in Example 5, but using, instead of the gelatin derivative described in the said example, 10 g. of the gelatin derivative II prepared according to Example 3(a) which had been treated with nitrous acid.

EXAMPLE 9

6.0 g. of polyphloretin phosphate were dissolved in 50 cc. of water. The resulting solution was neutralized with 22.5 cc. of 1 N NaOH and filtered. At the same time, 7.5 g. of gelatin derivative I (prepared as described in Example 1), 40 mg. of $\beta^{1-23}$-corticotropin-23-amide having 100 I.U./mg. and 2.5 g. of sodium glutamate were dissolved in 100 cc. of water. The polyphloretin phosphate solution was then allowed to run slowly into this solution while stirring. A clear to slightly opalescent solution was obtained. After the pH was adjusted to 6.5–7.0, the whole was made up with water to a volume of 200.0 cc. and after sterile filtration it was filled under sterile conditions into vials each having a capacity of 1–2 cc. and freeze-dried; the vials were then sealed.

We claim:

1. A process for the manufacture of a preparation having a protracted ACTH-effect which comprises combining in any order (a) an aqueous solution of ACTH or of $\beta^{1-23}$-corticotropin-23-amide, (b) a neutralized aqueous solution of polyphloretin phosphate, and (c) an aqueous solution of (1) deaminated natural or partially degraded gelatin or (2) natural or partially degraded gelatin, the amino groups of which are at least partially acylated, acid solutions of said gelatins being neutralized, and then adjusting the combined solutions to isotonicity and to a pH value between 5.5 and 7.5, the ratio by weight of ACTH or $\beta^{1-23}$-corticotropin-23-amide to polyphloretin phosphate to said natural or partially degraded gelatin being 1:50–300:50–300.

2. A product prepared according to the process of claim 1.

References Cited

UNITED STATES PATENTS 2,158,117   5/1939   Grettie _____ 99—130
2,827,419   5/1958   Deetourtellotte et al. __ 167—78
3,036,956   5/1962   Thompson _____ 167—74

(Other references on following page)

UNITED STATES PATENTS

| | | | |
|---|---|---|---|
| 3,057,782 | 10/1962 | Lindner et al. | 167—78 |
| 3,135,663 | 6/1964 | Muggleton et al. | 167—79 |
| 3,192,114 | 6/1965 | Hogberg et al. | 167—74 |
| 3,264,280 | 8/1966 | Hofmann et al. | 260—112.5 |

FOREIGN PATENTS

| | | |
|---|---|---|
| 920,148 | 11/1954 | Germany. |
| 960,579 | 3/1957 | Germany. |
| 951,228 | 10/1956 | Germany. |
| 1,118,792 | 12/1961 | Germany. |
| 1,155,134 | 10/1963 | Germany. |

OTHER REFERENCES

ACTA Endocrinologica, Hedner, P. pp. 499–501, vol. 43, 1963.

ALBERT T. MEYERS, Primary Examiner

HOWARD M. ELLIS, Assistant Examiner

U.S. Cl. X.R.

260—112.5